(12) United States Patent
Qiu et al.

(10) Patent No.: US 10,829,024 B2
(45) Date of Patent: Nov. 10, 2020

(54) VEHICLE

(71) Applicant: TOYOTA JIDOSHA KABUSHIKI KAISHA, Toyota (JP)

(72) Inventors: Zekai Qiu, Nisshin (JP); Hironobu Kitaoka, Nisshin (JP); Naoki Yamamuro, Nagoya (JP); Kozo Kosho, Toyota (JP); Hiroaki Sugiyama, Nagoya (JP); Makoto Ikegami, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/170,813

(22) Filed: Oct. 25, 2018

(65) Prior Publication Data

US 2019/0126802 A1    May 2, 2019

(30) Foreign Application Priority Data

Oct. 30, 2017 (JP) ................. 2017-209221

(51) Int. Cl.
  *B60N 3/10* (2006.01)
  *B60R 7/04* (2006.01)
  *B60N 2/75* (2018.01)

(52) U.S. Cl.
  CPC .............. *B60N 3/104* (2013.01); *B60R 7/046* (2013.01); *B60N 2/793* (2018.02)

(58) Field of Classification Search
  CPC ............... B60R 7/046; B60R 13/0243; B60R 2013/0287; B60R 11/00; B60R 7/04; B60R 13/02; B60R 2013/0281; B60N 2/78; B60N 3/102; B60N 3/101; B60N 3/026; B60N 3/10; B60N 2/79; B60N 2/797; B60N 3/00

USPC ...... 296/37.13, 146.7, 37.16, 153, 223, 214, 296/84.1; 224/544, 401, 92.6, 915, 585, 224/277, 311; 264/255, 279, 248, 250, 264/278

See application file for complete search history.

(56) References Cited

U.S. PATENT DOCUMENTS

| | | | | |
|---|---|---|---|---|
| 6,026,646 | A * | 2/2000 | Hansen | B60N 3/104 220/6 |
| 6,155,063 | A * | 12/2000 | Felde | A47J 31/005 296/37.12 |
| 6,282,906 | B1 * | 9/2001 | Cauchy | B60N 3/104 62/3.3 |
| 6,732,534 | B2 * | 5/2004 | Spry | B60N 3/104 62/3.7 |
| 7,389,650 | B2 * | 6/2008 | Kukucka | B60N 3/104 296/37.12 |
| 9,163,863 | B1 * | 10/2015 | Armstrong | B60N 3/104 |

FOREIGN PATENT DOCUMENTS

| | | |
|---|---|---|
| DE | 102014201566 A1 | 7/2015 |
| GB | 2509119 A | 6/2014 |
| JP | 2002-206838 A | 7/2002 |
| JP | 2016068854 A | 5/2016 |
| JP | 2017114230 A | 6/2017 |

* cited by examiner

*Primary Examiner* — D Glenn Dayoan
*Assistant Examiner* — Sunsurraye Westbrook
(74) *Attorney, Agent, or Firm* — Hunton Andrews Kurth LLP

(57) ABSTRACT

According to the present disclosure, a vehicle includes: a main body; a first inner side surface and a second inner side surface of the main body located in a widthwise direction of the main body; and a cooling box provided at the first inner side surface.

7 Claims, 8 Drawing Sheets

VEHICLE

This nonprovisional application is based on Japanese Patent Application No. 2017-209221 filed on Oct. 30, 2017 with the Japan Patent Office, the entire contents of which are hereby incorporated by reference.

BACKGROUND

Field

The present disclosure relates to a vehicle.

Description of the Background Art

A van-type vehicle described in Japanese Patent Laying-Open No. 2002-206838 includes a driver's seat, a general baggage loading compartment, and a vehicle-mounted refrigerator. The general baggage loading compartment is disposed rearwardly of the driver's seat.

SUMMARY

For the above-described van type vehicle, when a driver seated on the driver's seat tries to pick up an item accommodated in the vehicle-mounted refrigerator, the driver must get off the vehicle. In order to solve such a problem, it is conceivable to dispose a cooling box in the passenger compartment of the vehicle.

However, depending on the position of the cooling box in the passenger compartment, it is difficult for a passenger to reach the cooling box.

The present disclosure has been made in view of the above-described problem, and an object thereof is to provide a vehicle on which a cooling box easy to use for a passenger of the vehicle is mounted.

According to the present disclosure, a vehicle comprises: a main body; a first inner side surface and a second inner side surface of the main body located in a widthwise direction of the main body; and a cooling box provided at the first inner side surface.

The main body includes a door provided to the main body movably and forming the first inner side surface, and the cooling box is provided at the door.

Inside the main body a passenger compartment is formed to accommodate a passenger therein, the door is provided to the main body so as to move rearward with respect to the main body when the passenger compartment is opened, and the cooling box is provided on the side of a front end of the door.

The door is provided rotatably about a vertically extending axis of rotation, and the cooling box is provided to the door on the side of the axis of rotation with respect to a center of the door in a widthwise direction of the door.

The door is provided rotatably about a horizontally extending first axis of rotation, and the cooling box is provided to the door movably about a horizontally extending second axis of rotation.

According to the present disclosure, a vehicle comprises: a main body with a passenger compartment formed therein and capable of accommodating a passenger therein; a seat disposed inside the passenger compartment; and a cooling box provided at the seat.

The seat includes a base and a seat body rotatable with respect to the base, and the cooling box is provided at the seat body.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

A vehicle according to the present embodiment will be described with reference to FIGS. 1 to 16. Of the configurations shown in FIG. 1 to FIG. 16, any configuration that is identical or substantially identical is identically denoted and will not be described redundantly.

First Embodiment

Figure 1:
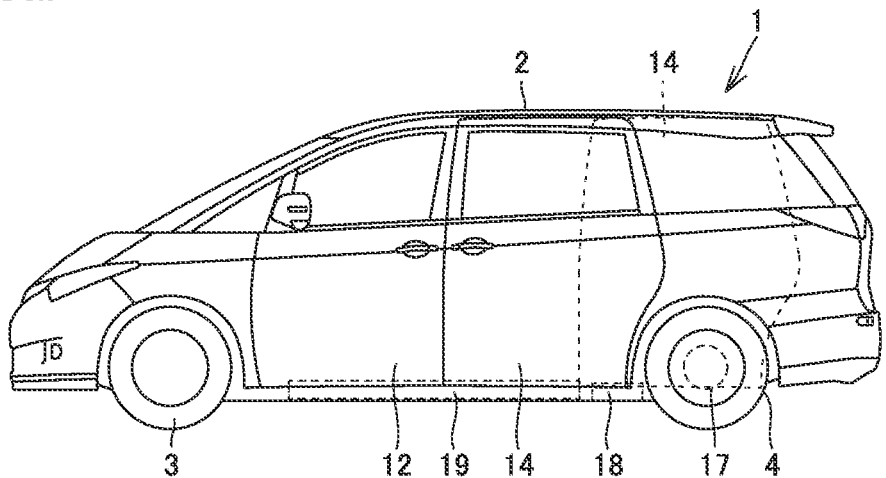
FIG. 1 is a side view of a vehicle 1 according to a first embodiment.

FIG. 1 is a side view of a vehicle 1 according to the first embodiment. Vehicle 1 comprises a main body 2, a front wheel 3, and a rear wheel 4. Front wheel 3 is provided to main body 2 on a front side in a front-rear direction of main body 2. Rear wheel 4 is provided to main body 2 on a rear side in the front-rear direction of main body 2.

Vehicle 1 includes a motor 17, a PCU 18, and a battery 19. Battery 19 is a secondary battery capable of being charged with power and discharging power. PCU (Power Control Unit) 18 is connected to battery 19, and receives DC power from battery 19, converts it into AC power and supplies it to motor 17.

Motor 17 receives the AC power from PCU 18 and uses it to generate a driving force for rotating rear wheel 4. Thus, vehicle 1 is an electric vehicle. Note that vehicle 1 may be a hybrid vehicle or the like. Furthermore, although vehicle 1 is driven by rear wheels, it may be driven by front wheels or by four wheels.

Figure 2:
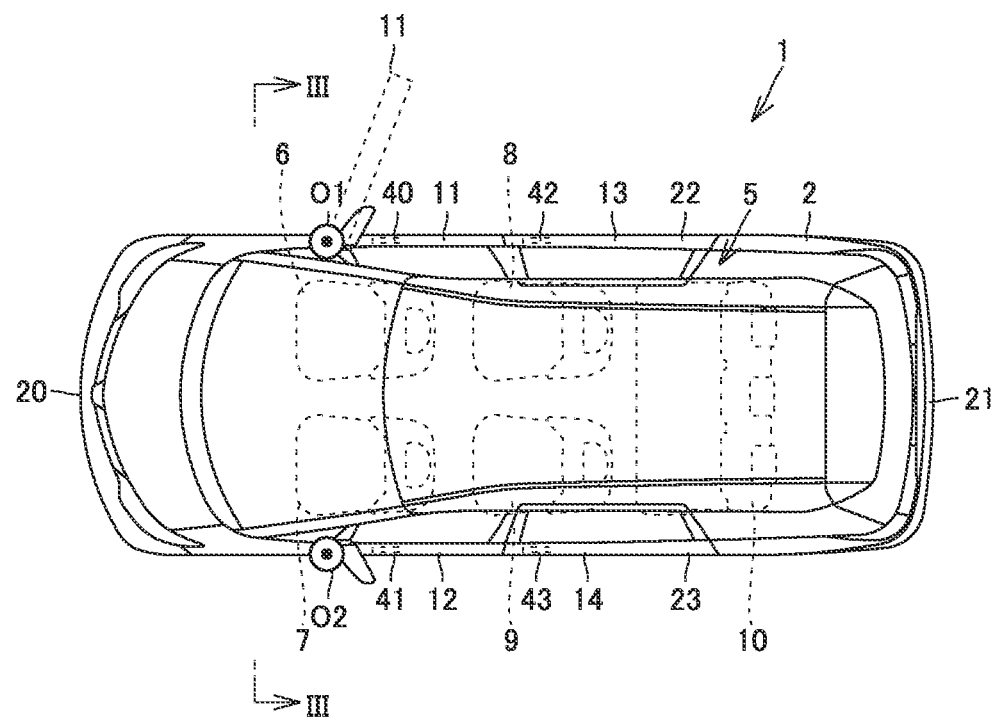
FIG. 2 is a plan view of vehicle 1.

FIG. 2 is a plan view of vehicle 1. A passenger compartment 5 is formed in main body 2. Vehicle 1 includes front seats 6, 7, center seats 8, 9, a rear seat 10, front doors 11, 12, rear doors 13, 14, and cooling boxes 40, 41, 42, 43.

Main body 2 includes a front surface 20, a back surface 21, a right side surface 22, and a left side surface 23. Front surface 20 is located on a front side of main body 2 and back surface 21 is located on a rear side of main body 2. Right side surface 22 and left side surface 23 are arranged in a widthwise direction of main body 2.

Front door 11 and rear door 13 are provided at right side surface 22, and front door 11 is disposed frontwardly of rear door 13.

Front door 11 is provided rotatably about an axis of rotation O1 located on the side of a front end of front door 11. Front door 11 can thus rotate and thus move with respect to main body 2, as shown in FIG. 2 by a broken line. Cooling box 40 is provided at front door 11.

Rear door 13 is provided movably with respect to main body 2 in the front-rear direction of main body 2. Rear door 13 can thus slide and thus move with respect to main body 2 in the front-rear direction of main body 2. Cooling box 42 is provided at rear door 13.

Front door 12 and rear door 14 are provided at left side surface 23 of main body 2. As well as front door 11, front door 12 is provided to main body 2 so as to be able to rotate and thus move about an axis of rotation O2 extending in the vertical direction. Cooling box 41 is provided at front door 12.

Figure 3:
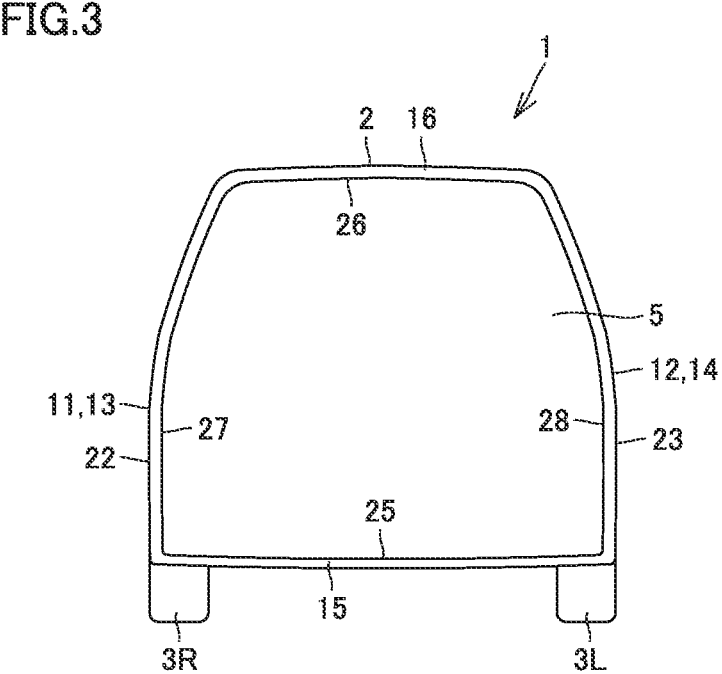
FIG. 3 is a schematic cross section taken along a line shown in FIG. 2.

Rear door 14 is provided on a rear side of main body 2 with respect to front door 12. As shown in FIG. 1, rear door 14 is provided to be slidably movable with respect to main body 2 in the front-rear direction. Cooling box 43 is provided at rear door 14. It is to be noted that, as well as rear door, 14, rear door 13 is also provided movably. FIG. 3 is a schematic cross section taken along a line shown in FIG. 2.

Main body 2 includes an inner bottom surface 25, an inner upper surface 26, a right inner side surface 27, a left inner side surface 28, a floor panel 15 and a roof 16. Floor panel 15 is a member that defines passenger compartment 5 from an outside, and forms inner bottom surface 25 of main body 2.

Roof 16 is also a member that defines passenger compartment 5 from an outside, and roof 16 forms inner upper surface 26.

Front door 11 and rear door 13 are provided at right side surface 22, and front door 11 and rear door 13 form right inner side surface 27 of main body 2. Front door 12 and rear door 14 are provided at left side surface 23, and front door 12 and rear door 14 form a left inner side surface 28 of main body 2.

Figure 4:
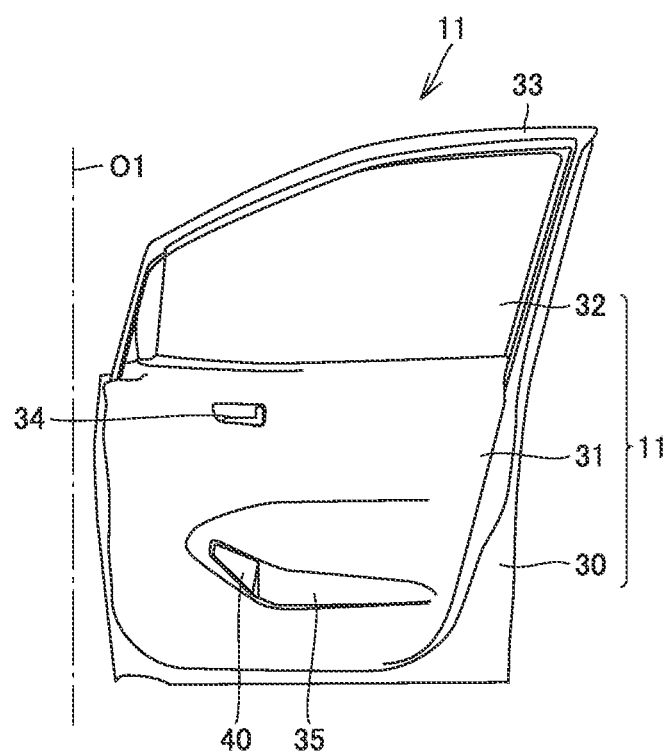
FIG. 4 is a front view of a front door 11.

FIG. 4 is a front view of front door 11. FIG. 4 is a front view of front door 11 viewed on the passenger compartment 5 side.

Front door 11 includes an outer door panel 30, an inner door panel 31, and a window glass 32. Outer door panel 30 is formed of a metal material, and outer door panel 30 forms an outer wall of an outer side of front door 11. Outer door panel 30 includes a door frame 33. Window glass 32 is disposed in a gap formed between outer door panel 30 and inner door panel 31, and window glass 32 is vertically movable by an actuator (not shown).

Inner door panel 31 is made of resin or the like, and inner door panel 31 forms an inner wall of front door 11. When front door 11 is closed, inner door panel 31 is located inside passenger compartment 5.

Inner door panel 31 has an inside door handle 34 attached thereto. A passenger can open front door 11 by operating inside door handle 34. Inner door panel 31 has a pocket 35. Cooling box 40 is provided in pocket 35.

Cooling box 40 is provided to front door 11 at a position on the side of axis of rotation O1 with respect to the center of front door 11 in the front-rear direction. In the example shown in FIG. 4, cooling box 40 is provided on the side of the front end of front door 11, and cooling box 40 is located at a lower side of inner door panel 31. This can help a driver seated on front seat 6 to reach cooling box 40 and take out an item stored in cooling box 40.

Figure 5:
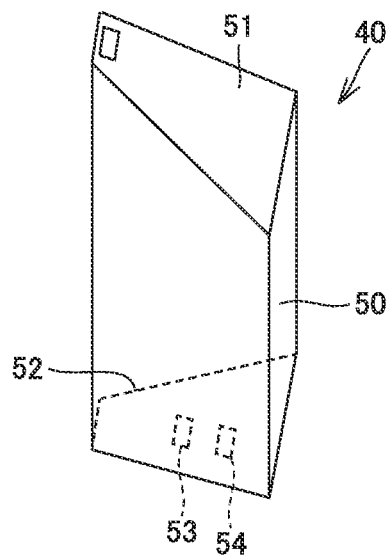
FIG. 5 is a schematic perspective view of a cooling box 40.

FIG. 5 is a schematic perspective view of cooling box 40. Cooling box 40 includes a main body 50, a lid 51, a Peltier element 53, and a battery 54. A storage chamber 52 is formed in main body 50, and Peltier element 53 is disposed at an inner bottom surface of main body 50. Main body 50 opens upward, and lid 51 is provided to main body 50 rotatably to be able to open and close an opening of main body 50. Storage chamber 52 can store an item such as a PET bottle therein. Peltier element 53 cools an item stored in storage chamber 52.

Battery 54 is attached to the bottom surface of main body 50, and Peltier element 53 is driven by electric power received from battery 54. Cooling box 40 is configured to be removable from pocket 35. Cooling box 40 detached from front door 11 can thus be taken out of vehicle 1. In a state with cooling box 40 attached inside pocket 35, battery 54 is electrically connected to battery 19, and battery 54 is electrically charged from battery 19.

It should be noted that front door 12 is configured in the same manner as front door 11, and cooling box 41 is configured in the same manner as cooling box 40.

Figure 6:
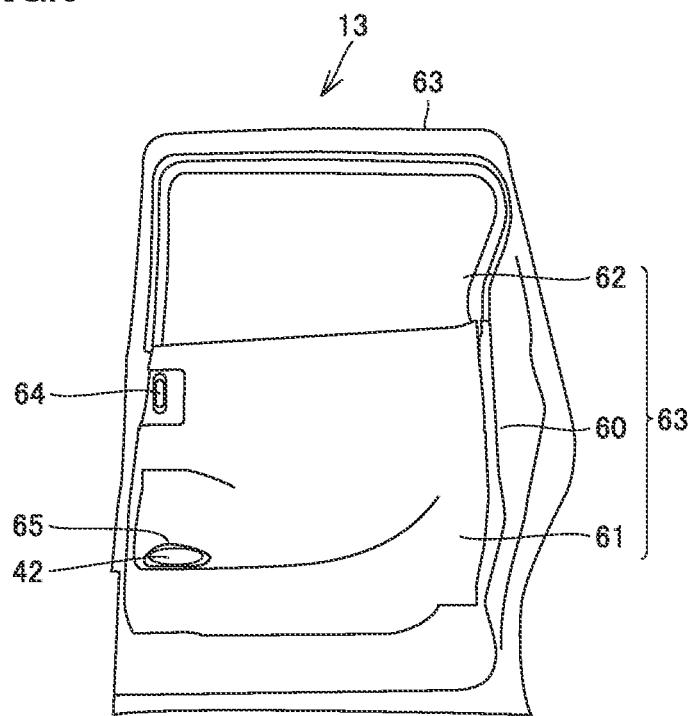
FIG. 6 is a plan view of a rear door 13.

FIG. 6 is a plan view of rear door 13. FIG. 6 is a front view of rear door 13 viewed on the passenger compartment 5 side.

Rear door 13 includes an outer door panel 60, an inner door panel 61, and a window glass 62. Outer door panel 60 is formed of a metal material, and outer door panel 60 forms an outer wall of an outer side of rear door 13. Outer door panel 60 includes a door frame 63.

Window glass 62 is disposed in a gap formed between outer door panel 60 and inner door panel 61, and window glass 62 is vertically movable by an actuator (not shown).

Inner door panel 61 is made of resin or the like, and inner door panel 61 forms an inner wall of rear door 13. Rear door 13 is slidably movable with respect to main body 2, and when rear door 13 is closed, inner door panel 61 is located inside passenger compartment 5.

Inner door panel 61 is provided with an inside door handle 64, and below inside handle 64 a pocket 65 is formed. Cooling box 42 is provided in pocket 65.

Figure 7:
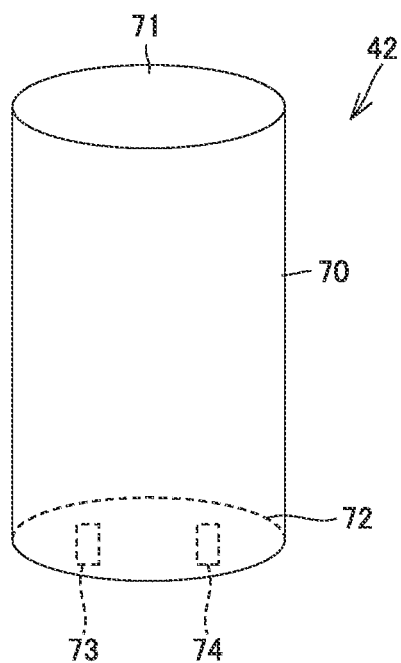
FIG. 7 is a schematic perspective view of a cooling box 42.

FIG. 7 is a schematic perspective view of cooling box 42. Cooling box 42 includes a main body 70, a lid 71, a Peltier element 73, and a battery 74. A storage compartment 72 is formed in main body 70.

Main body 70 has an opening which opens upward. Lid 71 is provided to be able to open and close the opening of main body 70.

Peltier element 73 is provided at a bottom surface of storage compartment 72, and Peltier element 73 cools an item stored in storage compartment 72. Battery 74 supplies Peltier element 73 with power. Battery 74 is attached to the bottom surface of main body 70. In a state with cooling box 42 attached inside pocket 65, battery 74 is electrically connected to battery 19, and battery 74 is electrically charged from battery 19.

Cooling box 42 can be detached from pocket 65 and brought out of vehicle 1. Cooling box 42 is provided to rear door 13 on the side of the front end of the rear door with respect to the center of the rear door in the front-rear direction. This prevents cooling box 42 from contacting main body 2 when rear door 13 is slid and thus moved rearward to open passenger compartment 5.

In particular, cooling box 42 is located below inside handle 64, which helps a passenger seated on rear seat 10 to reach cooling box 42 and thus take out an item stored in cooling box 42.

It should be noted that rear door 14 is configured in the same manner as rear door 13, and cooling box 43 is configured in the same manner as cooling box 42.

Second Embodiment

Figure 8:
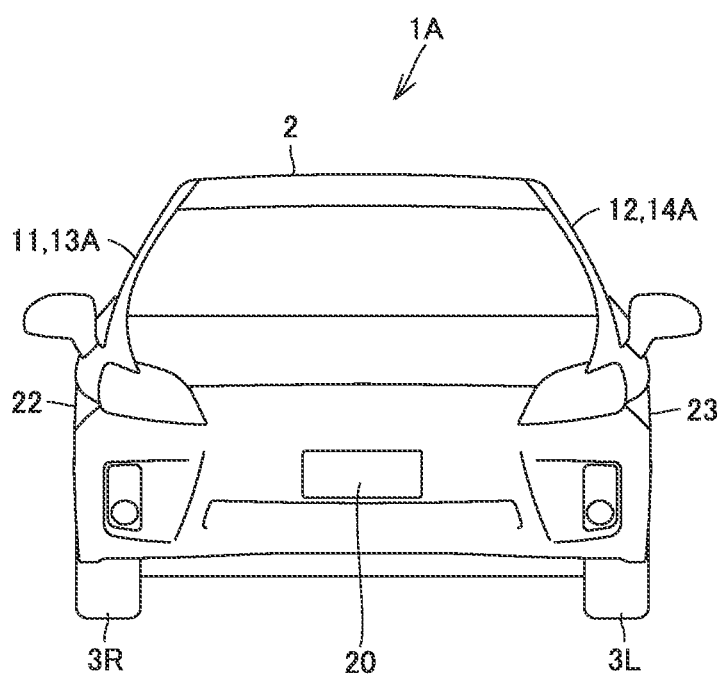
FIG. 8 is a front view of a vehicle 1A.
Figure 9:
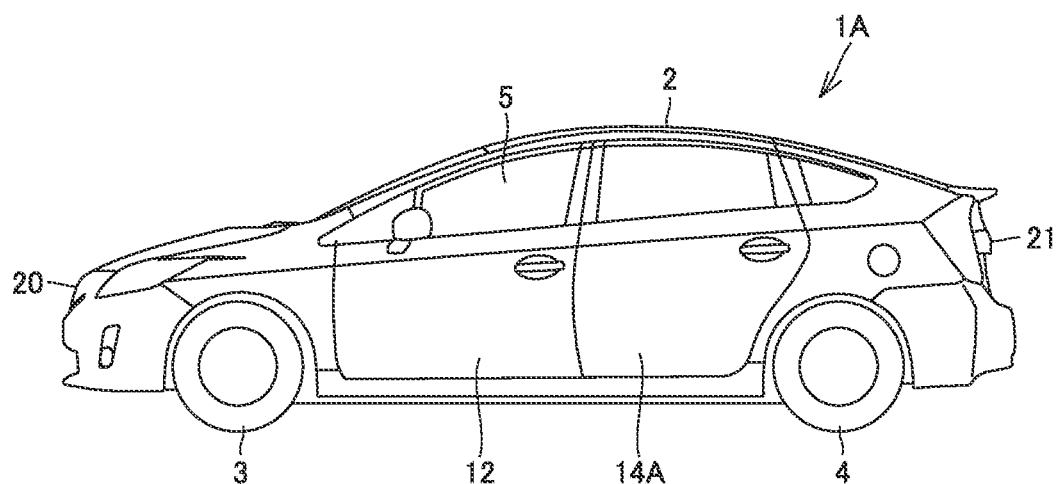
FIG. 9 is a side view of vehicle 1A.
Figure 10:
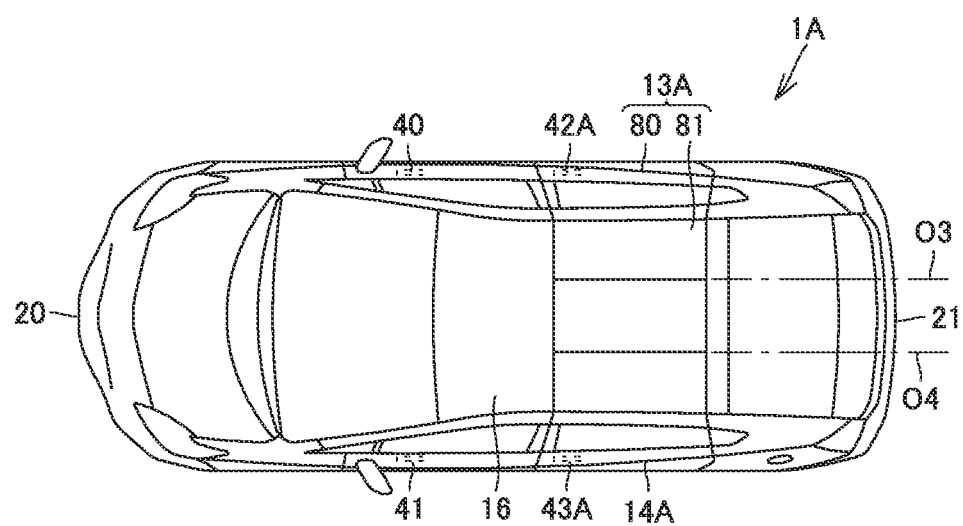
FIG. 10 is a plan view of vehicle 1A.

With reference to FIG. 8 and so forth, a vehicle 1A according to a second embodiment will be described. FIG. 8 is a front view of vehicle 1A and FIG. 9 is a side view of vehicle 1A. FIG. 10 is a plan view of vehicle 1A. Vehicle 1A also comprises main body 2, front doors 11 and 12, rear doors 13A and 14A, and cooling boxes 40, 41, 42A, 43A. In main body 2, passenger compartment 5 is formed to accommodate a passenger therein.

Figure 11:
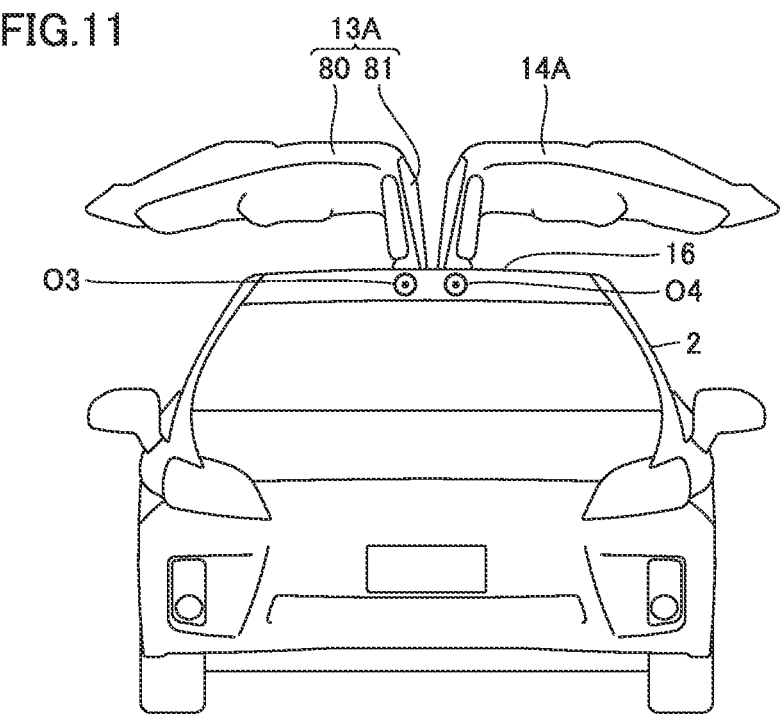
FIG. 11 is a front view in a state with rear doors 13A, 14A in an open state.

FIG. 11 is a front view in a state with rear doors 13A, 14A in an open state. Rear door 13A is provided to main body 2 so as to be rotatable about an axis of rotation O3.

Axis of rotation O3 is located near roof 16, and axis of rotation O3 is an imaginary line extending in the front-rear direction of main body 2. In the process of opening rear door 13A, axis of rotation O3 is positionally slightly moved to prevent rear door 13A from rotating in a wide trajectory.

Rear door 13A includes a door body 80 and a support portion 81. Support portion 81 is connected to an upper end of door body 80 and is formed so as to extend from the upper end of door body 80 toward an upper surface of main body 2. Accordingly, as shown in FIG. 10, support portion 81 also constitutes a part of roof 16.

Figure 12:
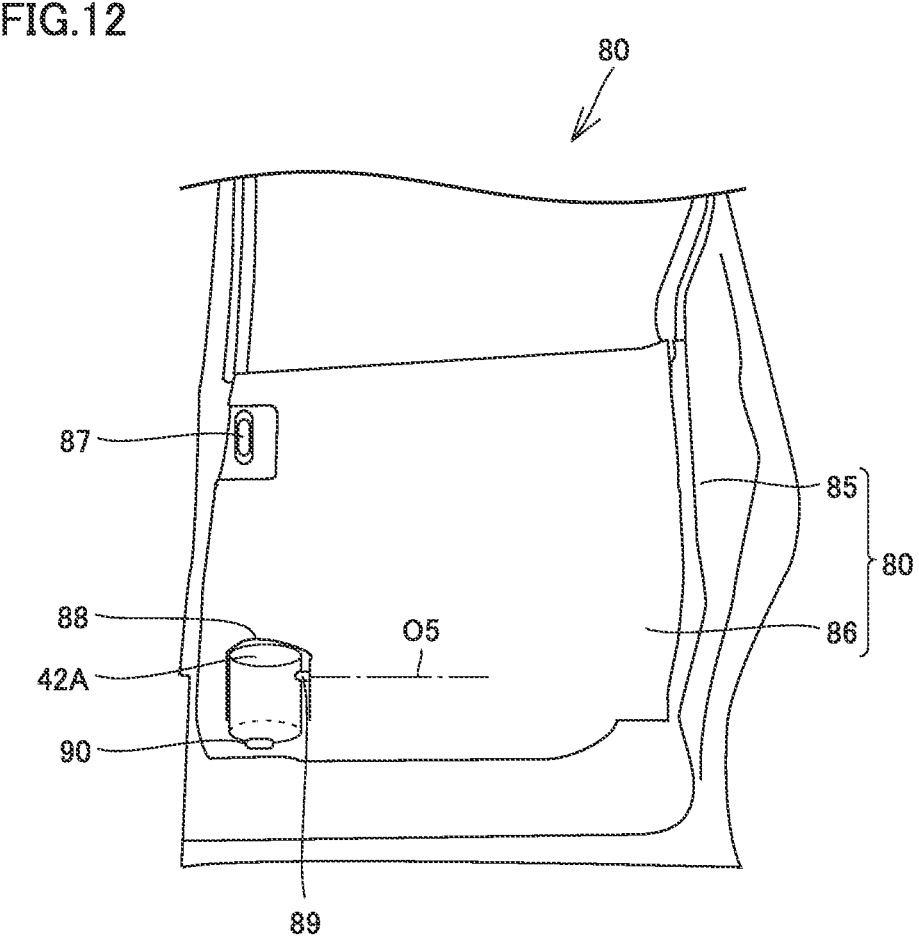
FIG. 12 is a plan view of a part of a door body 80 of rear door 13A.

FIG. 12 is a plan view of a part of door body 80 of rear door 13A. Door body 80 includes an outer door panel 85 and an inner door panel 86.

Inner door panel 86 is provided with an inside door handle 87. In a state with rear door 13A closed, inner door panel 86 has a lower portion with a recess 88.

Cooling box 42A is disposed in recess 88 and cooling box 42A is provided to be rotatable about an axis of rotation O5 by a hinge 89 formed at inner door panel 86. Hinge 89 extends in the front-rear direction of main body 2, and axis of rotation O5 is an imaginary line extending in the front-rear direction of main body 2. Inner door panel 86 is provided with a locking device 90.

When rear door 13A is closed, locking device 90 locks rotation of cooling box 42A, and when rear door 13A is opened, locking device 90 unlocks cooling box 42A.

Figure 13:
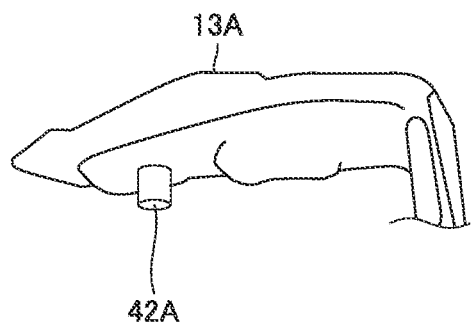
FIG. 13 is a schematic view of a cooling box 42A in a state with rear door 13A opened.

FIG. 13 is a schematic view of cooling box 42A in a state with rear door 13A opened. Cooling box 42A is prevented from tilting even when rear door 13A is opened. This can prevent an item inside cooling box 42A from falling out of cooling box 42A while cooling box 42A is being opened.

Note that hinge 89 is provided so as to be capable of expand and contract in the front-rear direction of main body 2. Therefore, by causing hinge 89 to contract, cooling box 42A can be removed from rear door 13A. While cooling box 42A has been described in detail, cooling box 43A is also configured in the same manner as cooling box 42A.

In vehicle 1A according to the second embodiment, as well as vehicle 1 according to the first embodiment, cooling boxes 41, 42 are provided at front doors 11, 12.

Third Embodiment

Figure 14:
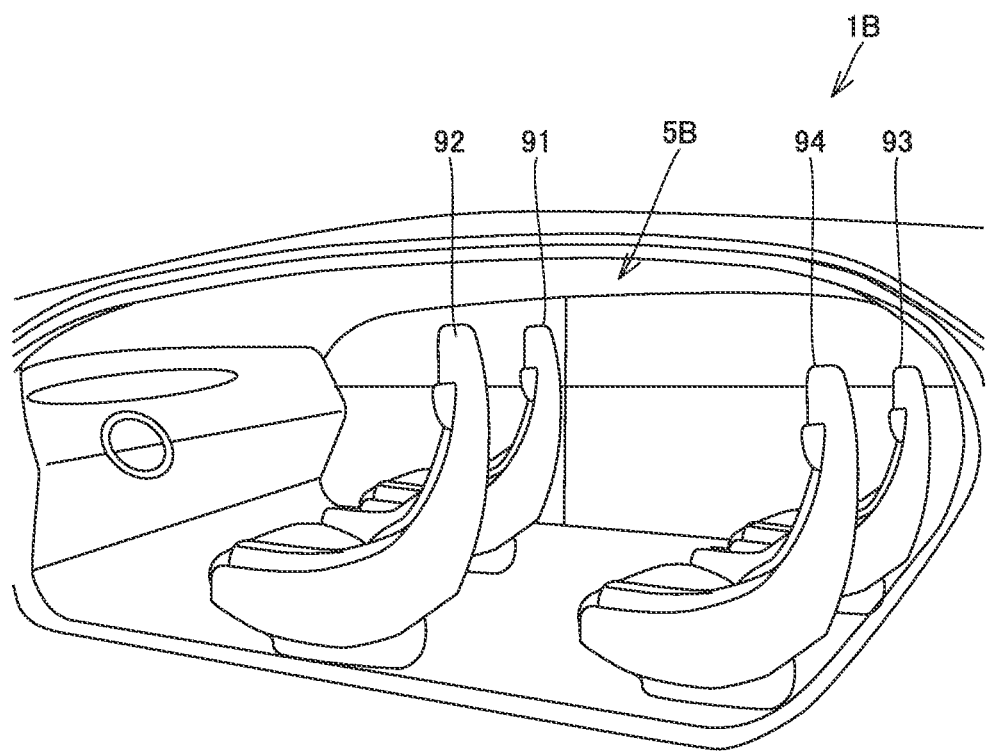
FIG. 14 is a schematic perspective view of a part of a vehicle 1B.

With reference to FIG. 14 and so forth, a vehicle 1B according to a third embodiment will be described. FIG. 14 is a schematic perspective view of a part of vehicle 1B. In FIG. 14, front door 12 and rear door 13 are not shown.

A passenger compartment 5B is formed inside a main body 2B. In passenger compartment 5B, front seats 91 and 92 and rear seats 93 and 94 are disposed.

Figure 15:
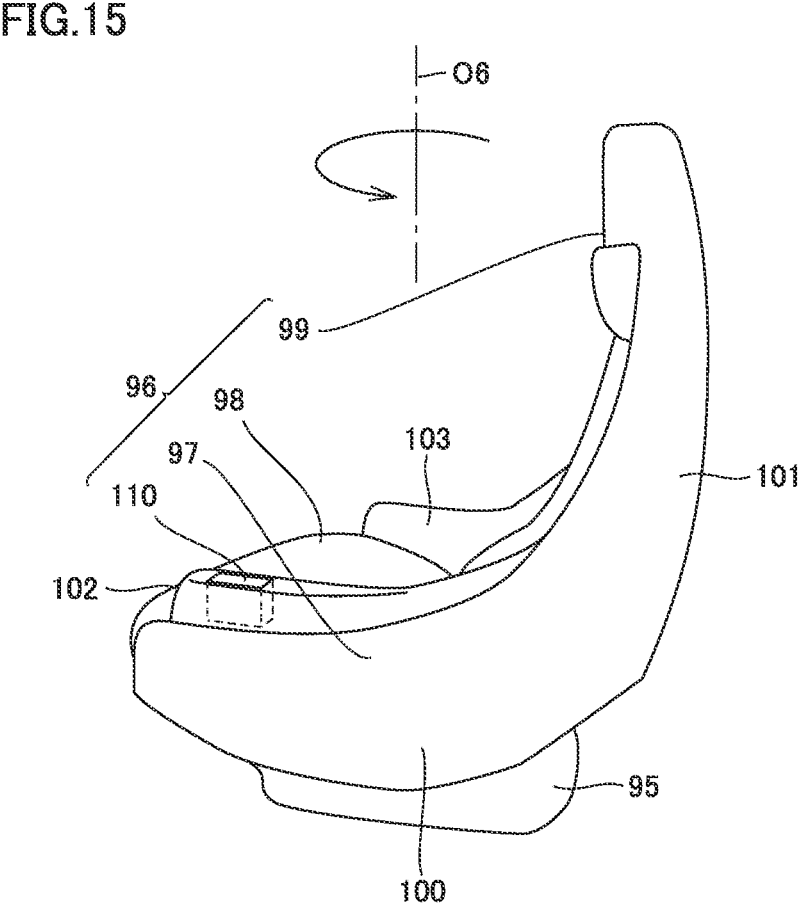
FIG. 15 is a schematic perspective view of a front seat 91.

FIG. 15 is a schematic perspective view of front seat 91. Front seat 91 includes a base 95 and a seat body 96.

Base 95 is fixed to a bottom surface of main body 2B. Seat body 96 is provided so as to be rotatable about an axis of rotation O6 with respect to base 95.

Thus, in FIG. 14, by rotating front seat 92, a passenger seated in front seat 92 and a passenger seated in rear seat 94 can face each other. Front seat 91 is configured to be similar to front seat 92.

Returning to FIG. 15, seat body 96 includes a seat shell 97, a seat cushion 98, a headrest 99, and a cooling box 110.

Seat shell 97 is made of resin or the like. Seat shell 97 includes a seating portion 100, a backrest 101, and armrests 102, 103.

Seating portion 100 forms a portion on which a passenger sits. Backrest 101 is formed to support the back of the passenger. Armrests 102, 103 are portions each receiving an arm of the passenger. Seat cushion 98 is provided in seat shell 97.

Armrest 102 is located on the side of a lateral surface of vehicle 1B, and armrest 103 is located on the side of a center of vehicle 1B in the widthwise direction of vehicle 1B. Cooling box 110 is provided in armrest 102.

Cooling box 110 is thus provided to seat body 96, and even when seat body 96 is rotated with respect to base 95, cooling box 110 is still located close to a hand of a passenger, and the passenger can easily take an item out of cooling box 110.

Figure 16:
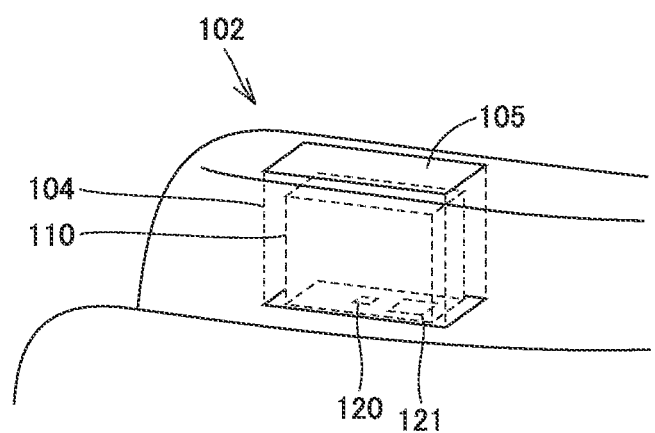
FIG. 16 is a schematic perspective view of an armrest 102 and its surrounding configuration.

FIG. 16 is a schematic perspective view of armrest 102 and its surrounding configuration.

An accommodation compartment 104 is formed in armrest 102, and a lid 105 is provided at an upper surface of armrest 102.

Accommodation compartment 104 is formed so as to open upward, and lid 105 is provided to be able to open and close the opening.

Cooling box 110 is provided in accommodation compartment 104. In cooling box 110 a storage compartment is formed for storing an item. Cooling box 110 also includes a Peltier element 120 and a battery 121. Cooling box 110 is configured to be detachable from armrest 102. Cooling box 110 can thus be taken out of vehicle 1B. Although a configuration of front seat 92 has been described in detail, front seat 91 is configured in the same manner as front seat 92, and front seat 92 is also provided with a cooling box. Rear seats 93, 94 are also configured in the same manner as front seat 92, and rear seats 93, 94 are also provided with a cooling box.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A vehicle comprising:
   a main body;
   a first inner side surface and a second inner side surface of the main body located in a widthwise direction of the main body; and a cooling box provided at the first inner side surface,
wherein the cooling box includes a main body with a storage chamber formed inside, a cooling element, and a battery,
wherein the battery is attached to the main body,
wherein the cooling element is disposed at the main body and, driven by electric power received from the battery,
wherein the first inner side surface has a pocket,
wherein the cooling box is provided in the pocket, and
wherein the cooling box is removable from the pocket.

2. The vehicle according to claim 1, wherein
the main body includes a door provided to the main body movably and forming the first inner side surface, and
the cooling box is provided at the door.

3. The vehicle according to claim 2, wherein
inside the main body a passenger compartment is formed to accommodate a passenger therein,
the door is provided to the main body so as to move rearward with respect to the main body when the passenger compartment is opened, and
the cooling box is provided on a side of a front end of the door.

4. The vehicle according to claim 2, wherein
the door is provided rotatably about a vertically extending axis of rotation, and the cooling box is provided to the door on a side of the axis of rotation with respect to a center of the door in a widthwise direction of the door.

5. The vehicle according to claim 2, wherein
the door is provided rotatably about a horizontally extending first axis of rotation, and the cooling box is provided to the door movably about a horizontally extending second axis of rotation.

6. A vehicle comprising:
a main body with a passenger compartment formed therein and capable of accommodating a passenger therein;
a seat disposed inside the passenger compartment;
a cooling box provided at the seat,
an accommodation compartment is formed in the seat;
wherein the cooling box includes a main body with a storage chamber formed inside, a cooling element, and a battery,
wherein the battery is attached to the main body,
wherein the cooling element is disposed at the main body and, driven by electric power received from the battery,
wherein the cooling box is provided in the accommodation compartment, and
wherein the cooling box is removable from the accommodation compartment.

7. The vehicle according to claim 6, wherein
the seat includes a base, and a seat body rotatable with respect to the base, and the cooling box is provided at the seat body.

* * * * *